Oct. 5, 1937.   S. F. ANDERSON   2,094,769
APPARATUS FOR MAKING FROZEN CONFECTIONS
Filed Jan. 4, 1934   6 Sheets-Sheet 2

INVENTOR
Swan F. Anderson
By Chindahl, Parker, Carlson
ATTORNEYS

Oct. 5, 1937.   S. F. ANDERSON   2,094,769
APPARATUS FOR MAKING FROZEN CONFECTIONS
Filed Jan. 4, 1934    6 Sheets-Sheet 5

FIG. 13

INVENTOR
Swan F. Anderson
By Chindahl, Parker & Carlson
ATTORNEYS

Oct. 5, 1937.   S. F. ANDERSON   2,094,769
APPARATUS FOR MAKING FROZEN CONFECTIONS
Filed Jan. 4, 1934   6 Sheets-Sheet 6

INVENTOR
Swan F. Anderson
By Clindall, Parker Carlen
ATTORNEYS

Patented Oct. 5, 1937

2,094,769

UNITED STATES PATENT OFFICE 2,094,769

APPARATUS FOR MAKING FROZEN CONFECTIONS

Swan F. Anderson, Rockford, Ill., assignor to Fred L. Borchert, Rockford, Ill.

Application January 4, 1934, Serial No. 705,196

29 Claims. (Cl. 107—8)

The invention pertains to the art of making frozen confections of the type consisting of a small brick of frozen material, such as ice cream, coated with chocolate or the like, and having a carrying stick or handle with one end embedded in the brick; and the primary object of the invention is to reduce the cost of making such confections.

A further object is to facilitate the making of frozen confections of the character indicated by a novel method of converting an elongated block of ice cream or like frozen material into a plurality of small bricks having carrying sticks embedded therein, and utilizing the sticks in suspending the bricks while chocolate or other coating material is being applied thereto.

Another object is to provide a novel and advantageous method of forming individual bricks with carrying sticks embedded at one end in the respective bricks and supported at their other ends in spaced relation with the bricks separated to facilitate the coating of the bricks by a dipping operation.

Another object is to provide an apparatus for use in carrying out my improved method of operation, including an elongated rack into which the carrying sticks are engaged as an incident to their insertion into the frozen material, for the purpose of suspending the individual bricks in separated relation for the final dipping operation.

Still another object is to provide in an apparatus having means for supporting an elongated block of frozen material and a carrying rack of the character above indicated, cutting means operable to form a series of individual bricks, and means for inserting carrying sticks into holding relation with said rack and into embedded or anchored relation to the individual bricks.

A further and general object is to provide an automatically operating machine of a practical character embodying apparatus of the character indicated for facilitating the making of frozen confections of the class set forth.

In the accompanying drawings, I have illustrated a preferred mode of operation in connection with an automatically operating machine of a practical character, but it is to be understood that in its broader aspects, my invention is not limited to the particular construction illustrated and hereinafter described except as may be defined in the appended claims.

In carrying out my invention, reference being made first to Figs. 1 to 5, an elongated block A of frozen material such as ice cream is adapted to be placed in an elongated trough 20, and parallel with the trough at one side thereof (herein above it) is positioned an elongated conveyor or rack 21 adapted to receive and retain carrying sticks 22 inserted through the rack 21. Through this rack, carrying sticks 22 are inserted, preferably one at a time, so as to force the lower ends of the sticks into the frozen material while the upper ends of the sticks are retained in frictional engagement with the rack as shown in Fig. 2.

Figure 3:
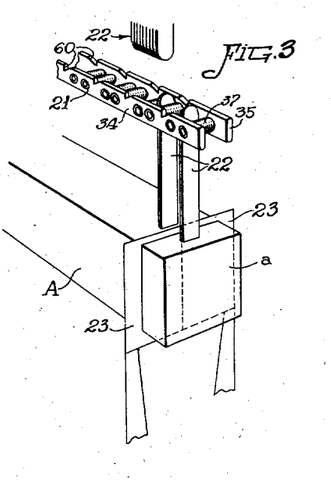
Figure 4:
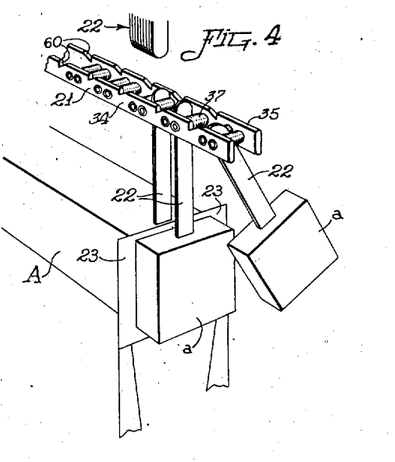
Figure 5:
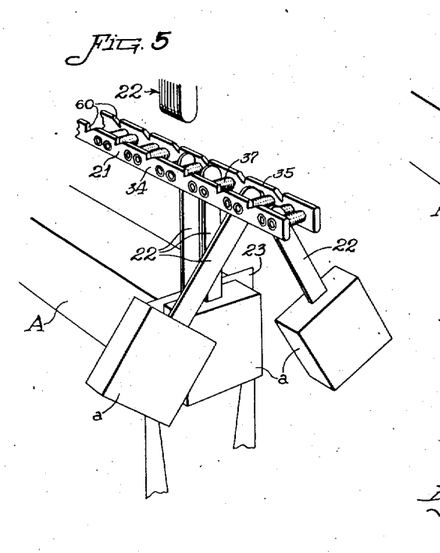

Both the block A of frozen material and the rack 21 are mounted for forward feeding movement in unison, and in timed relation to the insertion of the sticks 22 a pair of cutter blades 23 are operated to cut from the end of the block a slice or brick a (Fig. 3). In the present instance, the sticks are embedded into the end portion of the block in advance of the operation of the cutting blades to sever such end portion from the block in forming the brick a. While this particular order of operation is preferred for a reason to be hereinafter set forth, it will be obvious that this relation may be changed without departing from the spirit and scope of my invention.

Figure 12:
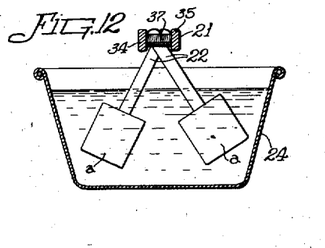
Fig. 12 is a transverse sectional view illustrating the dipping operation.

After the severed bricks have been advanced with the carrier a short distance from the cutting position, the handle portions or sticks thereof (Fig. 4) are swung automatically in opposite directions. This is for the purpose of separating the bricks from each other (Figs. 1 and 5) so that when the bricks are immersed in a bath of coating material, such as chocolate, the latter will be permitted to flow freely around the bricks. In this latter operation, the rack is removed from the machine, with the bricks suspended therefrom through the medium of their respective carrying sticks, and dipped simultaneously into the coating material. Fig. 12 shows an elongated container 24 having a quantity of coating material therein, and illustrating in section a rack having suspended bricks immersed in the material.

The performance of the several operations above generally referred to through the medium of automatically operating mechanism, constitutes an important feature of my invention, to the end that the making of the frozen confections shall be accomplished rapidly and effectually with a consequent reduction in the cost of production. Accordingly, I provide a power driven mechanism operating automatically to insert the sticks one at a time through the rack 21 and into the material constituting the bricks, together with means for actuating the cutting blades, means for advancing both the rack and the block A, and means for separating the bricks while suspended from the rack.

Figure 1:
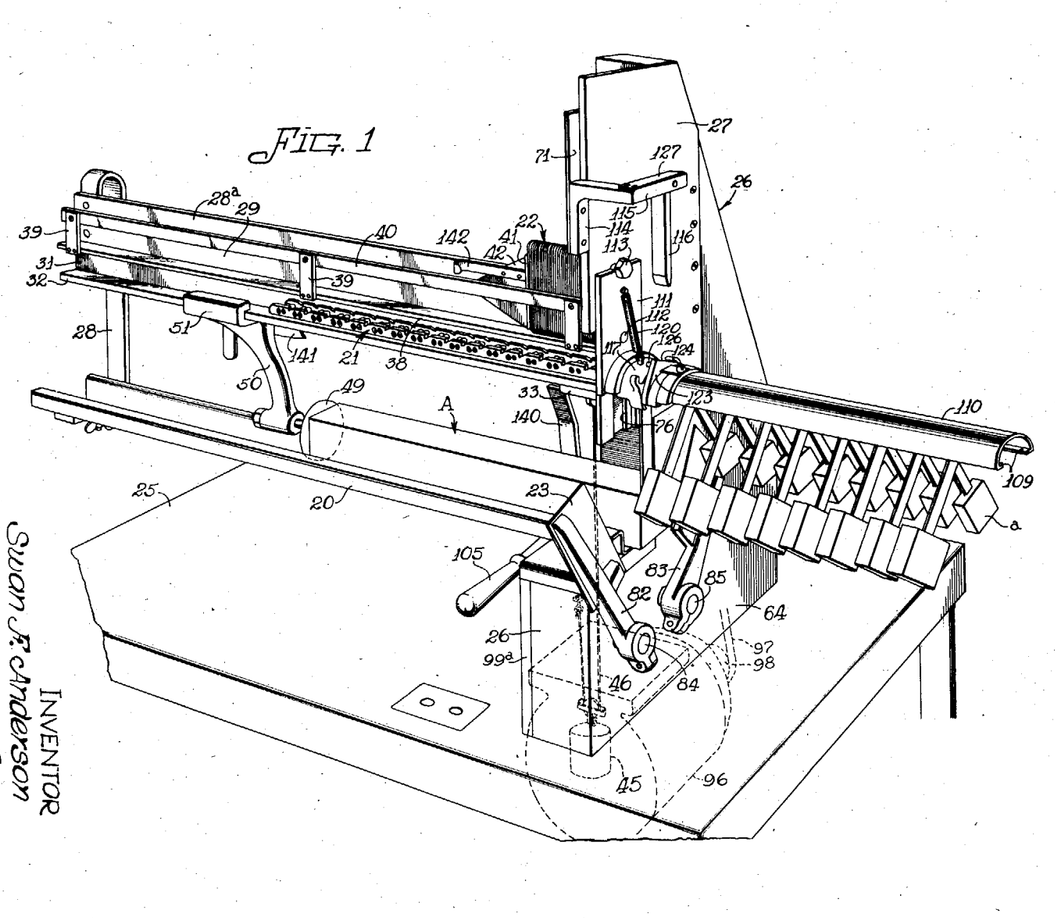
Figure 1 of the drawings is a fragmentary perspective view of a machine of the preferred character for carrying out my invention.
Figure 2:
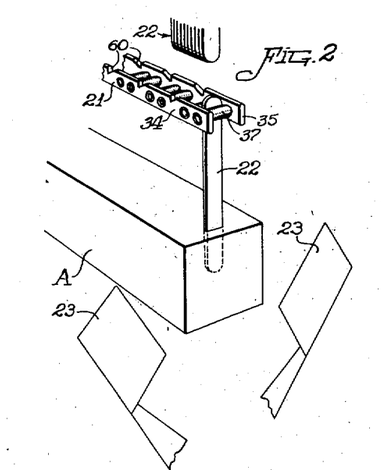
Figs. 2 to 5 are fragmentary perspective views illustrating somewhat schematically the operations of inserting the sticks forming the individual bricks from a block of frozen material and separating the blocks while suspended through the medium of the sticks, from a carrying rack.
Figures 6, 7, 8:
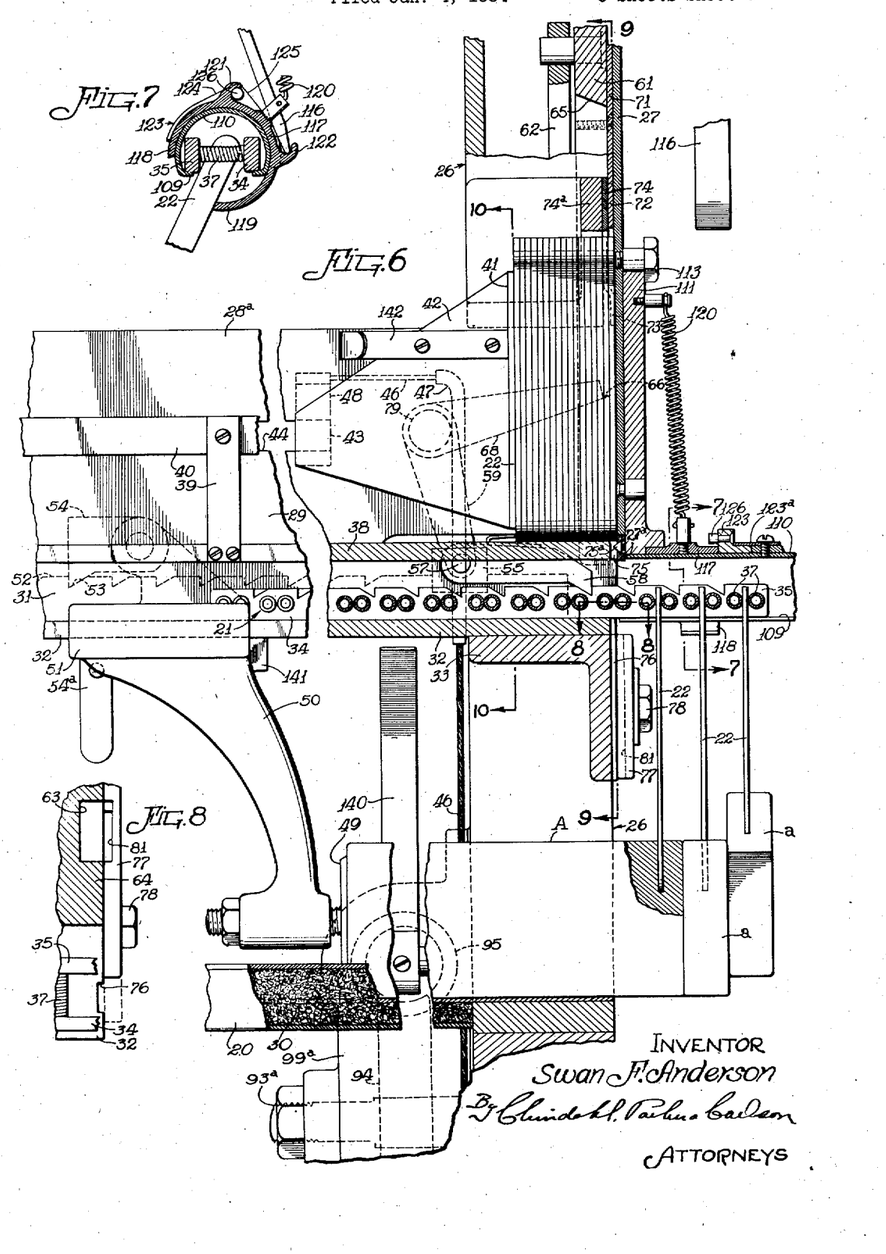
Fig. 6 is a fragmentary longitudinal sectional view illustrating primarily, the method of and means for inserting the carrying sticks through the supporting rack and into the frozen material.
Fig. 7 is a fragmentary transverse sectional view taken approximately in the plane of line 7—7 of Fig. 6, and illustrating the means operating upon the suspended sticks for separating the bricks.
Fig. 8 is a fragmentary horizontal sectional view taken approximately in the plane of line 8—8 of Fig. 6 but with the supporting rack shown in elevation.

Referring now to Figs. 1 and 6, the trough 20 is supported above and in spaced relation to a suitable base or table 25, with one end of the trough, which may be termed the forward end, mounted in an upright standard (Figs. 1 and 13) comprising a main hollow casting 26 extending transversely of the table 25 and having a front plate 27 (Fig. 1). At its rear end, the trough 20 is supported by a depending bracket arm 28 (Figs. 1 and 10) secured at its upper end to two elongated horizontal bars 28ª and 29 which project rearwardly from the upright standard. Preferably, the trough 20 is formed of sheet metal and constructed to provide hollow walls which are filled with an insulating material 30.

Below the bar 29 is a laterally opening channel for receiving and slidably supporting the rack 21. This channel is formed in part by a third horizontally disposed bar 31 (Fig. 10) and an elongated plate 32 providing a horizontal slideway for the rack. The plate 32 is supported at its forward end upon a transverse angular projection 33 of the casting 26 (Figs. 6 and 13), and at its rear end by the end bracket 28.

The rack 21 is composed of two spaced parallel bars 34 and 35 (Figs. 10 and 11) secured together by tightly coiled springs 37. These springs are arranged in pairs with the springs of each pair closely spaced so as to form a gripping device for the sticks, and with adjacent pairs of springs spaced apart a distance corresponding to the thickness of the bricks a to be formed.

The sticks 22 are adapted to be positioned within an elongated hopper, one side of which is formed by the bars 28ª and 29. A plate 38 interposed between said bar 29 and the bar 31 (Fig. 10) and projecting from the outer face of the bar 29 forms the bottom of said hopper. At the outer edge of the plate 38, upright arms 39 carry a narrow guide bar 40 spaced from the bar 29 (Fig. 10) a distance slightly greater than the width of the sticks 22 so as to form the opposite wall of the hopper.

Figure 10:
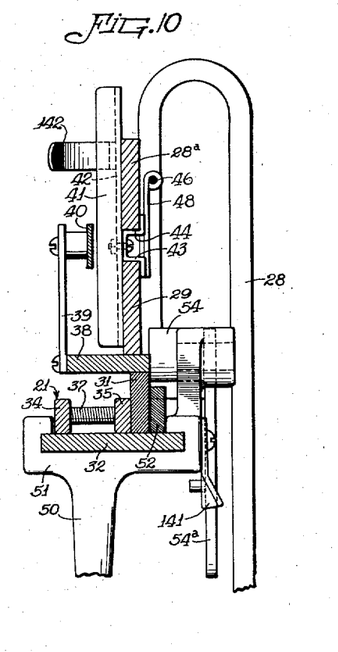
Fig. 10 is a fragmentary transverse sectional view taken approximately in the plane of line 10—10 of Fig. 6.

As will be observed from Figs. 1 and 6, the sticks 22 are fed forward in upright position by means of a follower or shoe 41 formed by a flange on the end of a substantially triangular plate 42 projecting rearwardly in the hopper and having a U-shaped clip 43 secured thereto and operating in a slot 44 between the plates 28ª and 29 (Figs. 6 and 10). The shoe 41 is yieldably pressed forwardly against the stack of sticks 22 by means of a weight 45 (Fig. 1) acting through the medium of a cable 46 passing through a bent tube 47 and anchored to an arm 48 secured to the clip 43.

Figure 11:
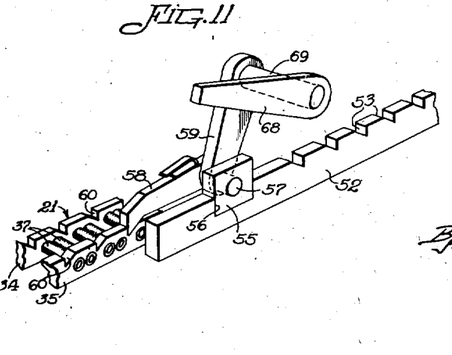
Fig. 11 is a fragmentary perspective view illustrating the means for feeding the rack.

Both the block A of frozen material and the rack 21 are arranged to be fed forwardly in unison. Accordingly, I provide a pressure plate 49 for engaging the rear end of the block A. This plate is carried by a vertical bracket 50 having a head 51 slidably engaging the opposite edges of the slide plate 32 for the rack 21 (Figs. 6 and 10). On the side of the bar 31 opposite the rack 21 is a rack bar 52 also slidably supported on the plate 32 and having teeth 53 at its upper edge adapted to be engaged by a pawl 54. The latter is pivotally mounted on the head 51 of the bracket 50 and has rigid therewith a hand lever 54ª for convenient manipulation. The rack bar 52 in turn is connected with the rack 21 by means of a block 55 fitted into a notch 56 in the forward end of the rack bar 52 (Fig. 11). A pin 57 mounted in said block carries a spring-pressed pawl 58 engageable with ratchet teeth 60 formed in the bar 35 of the rack 21, and the block 55 and pawl 58 are spaced apart laterally to receive between them an actuating arm 59 forming a part of the feed mechanism to be presently described.

Thus, it will be seen that when a forward motion is imparted to the rack 21 through the operation of the pawl 58, a similar motion is imparted to the rack bar 52 by reason of its connection with the pawl 58, and such movement of the rack bar 52 is transmitted to the pressure plate 49 by means of the pawl 54 engaging with the rack bar 52 and carried by the head 51 of the bracket 50. This construction is employed on account of the removable character of the rack 21 when the same is removed from the machine together with a series of suspended bricks for the dipping operation. In order that the rack may, when being replaced on its slide plate 32, be positioned with the bar 34 in cooperative relation to the pawl 58, the ratchet teeth 60 in the opposite bars 34 and 35 of the rack are disposed in opposite directions.

As will be apparent from Fig. 6, the feed motion imparted to the rack 21 and the bar A is of such character as to advance the rack and bar in each operating stroke of the pawl 58 a distance corresponding to the thickness of the brick to be formed. Also, it will be seen that at the end of each feeding motion, the rack must be stopped so as to present a pair of stick-retaining devices formed by springs 37 immediately beneath the foremost stick 22 to permit insertion of the latter between a pair of springs 37. The means herein employed for effecting such feed motion and for inserting the sticks through the rack and into the brick below will now be described.

Figure 13:
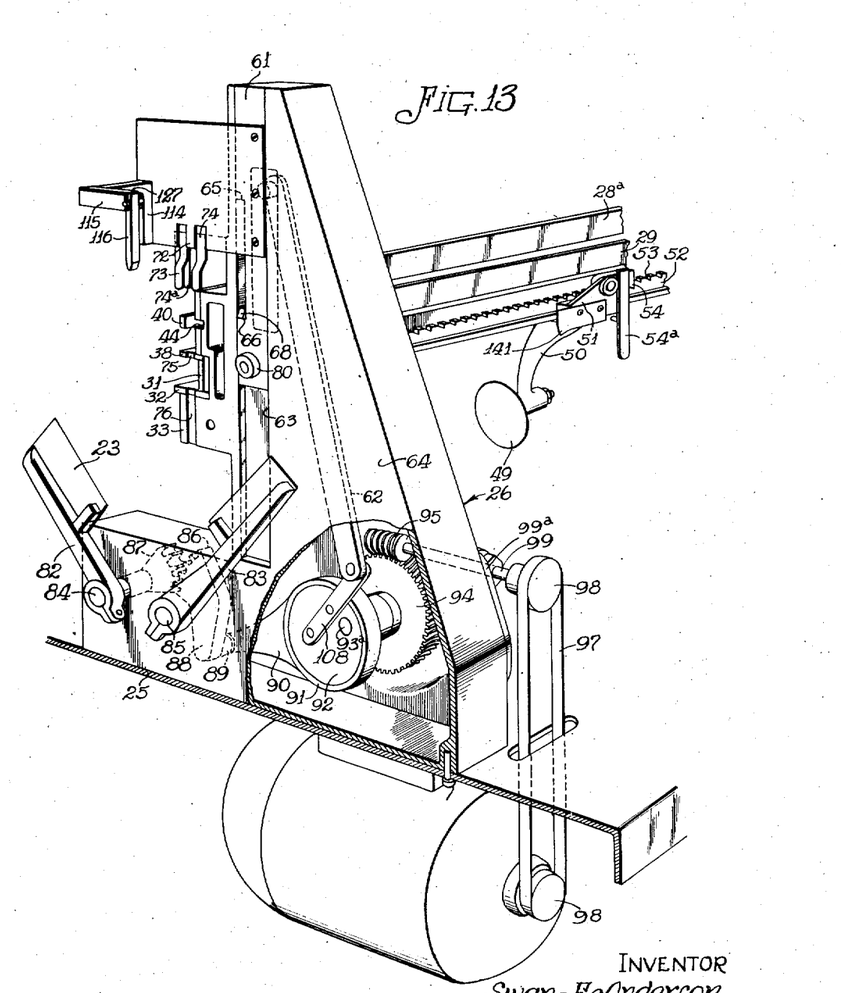
Fig. 13 is a fragmentary perspective view illustrating especially the drive mechanism and showing the main supporting structure with a part removed to show constructional details.
Figures 14, 15:
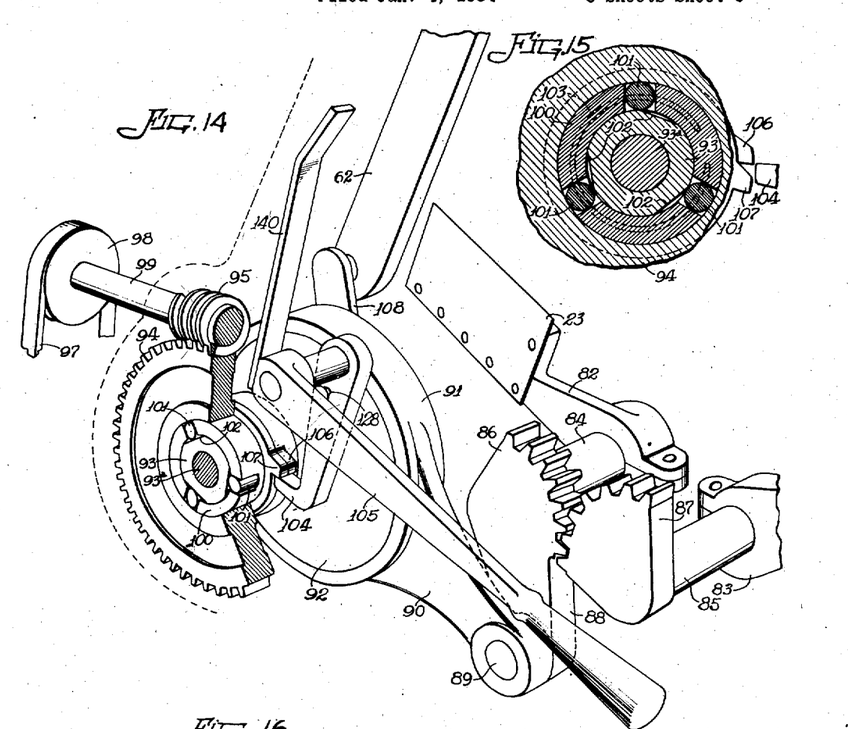
Fig. 14 is a fragmentary perspective view of a clutch controlled drive mechanism employed in the machine and including a portion of the means for actuating the shearing blades.
Fig. 15 is a fragmentary front elevational view of the clutch device.
Figure 16:
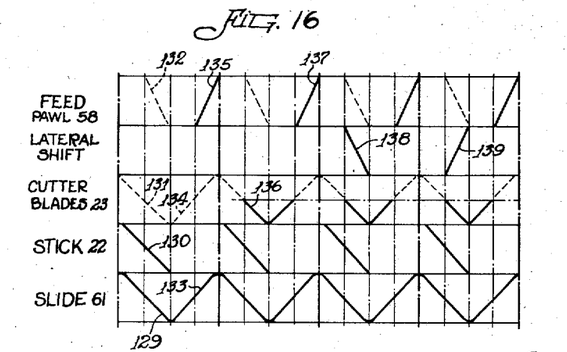
Fig. 16 is a time chart illustrating schematically the timed operation of the various parts of the machine.

Mounted within the upright standard is a vertically reciprocatory actuating slide 61 (Figs. 6 and 9) having an actuating link 62 pivoted thereto and extending downwardly for connection with a power actuated drive mechanism (Figs. 13 and 14). The slide 61 is guided for vertical movement in a slideway 63 formed in the front wall 64 of the casting 26. This slide 61 is cut away along one edge to form upper and lower shoulders 65 and 66, and projecting through a vertical slot 67 (Fig. 9) in the rear wall of the slideway 63 is an arm 68 pivotally mounted rearwardly of the standard on a pivot pin 69 supported in a bearing bracket 70. Rigid with this pivot pin 69 is the arm 59 (Fig. 11) operatively connected with the rack 21 and the rack bar 52 as above described.

The parts are so proportioned that in the latter portion of the downward movement of the slide 61 the arm 68 is engaged by the shoulder 65, thereby swinging the arm 59 rearwardly to retract the pawl 58 a distance sufficient to engage with the next succeeding tooth of the rack 21. Also, in such rearward movement of the arm 59, the rack bar 52 is moved rearwardly so as to cause the pawl 54 of the block feeding mechanism to engage with the next forward notch 53 of the rack bar. Conversely, in the upward movement of the slide 61, the arm 68 is engaged by the lower shoulder 66 of the slide so that the arm 68 is swung forwardly to cause the pawl 58 engaging with the rack 21 to advance the latter one step. At the same time the rack bar 52 is advanced one step carrying the block feeding plate 49 a corresponding distance forwardly.

The slide 61 is also utilized for the purpose of inserting the carrying sticks 22 through the rack 21 and into the block A. To this end, the slide has secured on its forward face a flat plate 71, which plate extends laterally from the slide as shown in Figs. 9 and 13, and has its lower edge formed to provide a plunger 72 in vertical alinement with the foremost stick 22, which, as shown in Fig. 6, is pressed against the forward standard plate 27.

The casting 26 has rigid therewith a bracket 74ª (Fig. 9) slotted to receive the upper end portions of the carrying sticks 22 as the same are delivered from their hopper, and the foremost one of such sticks is adapted to be received between a pair of spring arms 73 formed in the lower projecting portion of a plate 74 secured on the bracket 74ª, which plate is disposed rearwardly of the plunger plate 71 (Fig. 6). As shown in broken lines in Fig. 6, the lower ends of said arms 73 are bent forwardly so as to engage with opposite side edges of the foremost stick 22. Moreover, said arms extend downwardly a substantial distance so as to guide the stick in its downward movement, and the arms are adapted to yield rearwardly to permit passage of the plunger plate 71.

Figure 9:
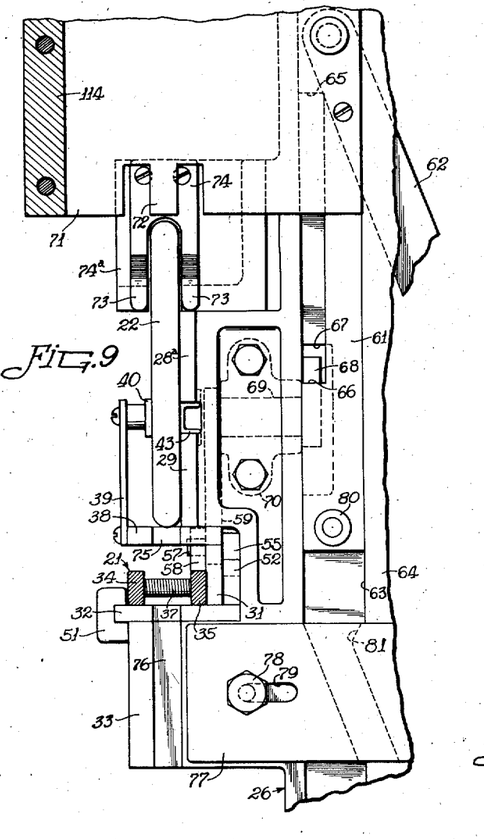
Fig. 9 is a fragmentary vertical sectional view taken approximately in the plane of line 9—9 of Fig. 6.

As will be seen from Figs. 6 and 9, when the slide is in its uppermost position, the plunger 72 is disposed immediately above the foremost carrying stick 22 so that upon the downward movement of the slide, the plunger engages with such foremost stick and forces it downward first through the slot 75 downwardly between a pair of the stick-retaining springs 37 and then through the slot 76 until the lower end portion of the stick is embedded in the forward end portion of the block A, as shown in Fig. 6. The slot 75 is formed by a groove in the forward end of the hopper plate 38, which groove is closed by a member 27ª equipped with a spring detent 75ª for yieldably supporting the foremost stick 22. Similarly, the slot 76 is formed by a groove cut in the forward end of the plate 32 and in the forward face of the projection 33 (Fig. 9) and closed by a laterally moving slide plate 77. Said plate is mounted on the forward face of the projection 33 by bolts 78 projecting through laterally elongated slots 79 in the plate, and is moved into operative or closing relation to its groove during the downward stroke of the slide 61. For this purpose, the plate 77 is engaged by a roller 80 on the lower end of the slide, which roller enters into a cam groove 81 formed in the rear face of the slide plate 77 as shown in broken lines in Fig. 9. In the initial portion of the upward travel of the actuating slide 61, the guide plate 77 is moved to open the slot 76 forwardly so that in the latter portion of the upward movement of said slide, the carrying stick is free to move forwardly with the advance of the rack 21.

Upon the completion of the initial downward stroke of the main actuating slide 61, the first carrying stick 22 will have been inserted through the first pair of retaining springs 37 of the rack 21 and into embedded or anchored relation to the block A as shown in Fig. 2. Thereupon the cutter blades 23 are actuated to sever the forward end portion of the block carrying the stick 22 so as to form the first brick $a$ (Fig. 3).

The blades 23 (Figs. 13 and 14) are respectively carried by arms 82 and 83 fast on two parallel shafts 84 and 85 having bearings in the standard below the forward end of the trough 20 (Fig. 1). Within the standard the shafts 84 and 85 are equipped with intermeshing segmental gears 86 and 87. The gear 86 is formed integral with an arm 88 pivotally connected at 89 with the arm 90 of an eccentric 91 actuated by an eccentrically mounted disk 92.

A suitable clutch is provided for driving the disk 92. As herein shown, the latter is fast on a tubular shaft 93 (Fig. 14) mounted on a fixed pin 93ª (Fig. 6) and constituting the driven member of the clutch, which is of the roller-wedge type. The driving member of this clutch is in the form of a worm gear 94 driven by a worm 95 as by means of an electric motor 96 (Fig. 1) through the medium of a belt 97 and two pulleys 98. The upper pulley 98 and worm 95 are fast on a shaft 99, and this shaft, together with the pin 93ª carrying the clutch, is mounted on a bracket 99ª suitably secured on the main casting 26.

Between the gear 94 and the tubular shaft 93 is interposed a cage 100 (Figs. 14 and 15) having rollers 101 adapted to cooperate with flat surfaces 102 on the tubular shaft 93. A spring 103 tends to move the cage 100 in a direction such as to cause the rollers to be engaged between the driving and driven members, thus effecting a driving connection therebetween. To disengage the clutch, a pawl 104 mounted on a hand lever 105, is movable into the path of two lugs 106 and 107 respectively rigid with the driven member and with the cage 100. When the clutch is engaged, the pawl 107 is disposed somewhat in advance of the pawl 106 (Fig. 14) so that when the pawl 104 is swung into the path of the lugs, the roller cage is operated against the action of its spring 103 to disengage the clutch and the driven member is brought to rest by the engagement of the lug 106 with the pawl.

It will be observed that in the operation of the driving disk 92, the eccentric 91 is reciprocated so as to oscillate the gears 86 and 87 and thereby the cutter blades 23. At the same time, the disk 92 operates through the medium of a crank arm 108 fast on the disk (Fig. 13) to reciprocate the link 62 and thereby the main actuating slide 61. The proportions are such that during the latter portion of the downward movement of the main actuating slide 61, in which the carrying stick 22 is inserted in the block A, the cutter blades engage with the end of the block so as to support the same while the stick is being inserted. In the initial portion of the upward movement of the slide, the cutter blades move outwardly into their open relation (Fig. 2) whereupon the rack feed mechanism is actuated to advance the rack and the block A.

As the rack 21 is advanced forwardly as an incident to the reciprocation of the main actuating slide 61, it engages slidably upon laterally spaced ways 109 formed by means of inturned flanges on the lower edges of an elongated sheet metal member 110 substantially semi-circular in cross section, as shown in Figs. 1 and 6. This member has its rear end rigidly secured as by welding to the lower portion of a plate 111 secured upon the front plate 27 of the upright standard (see Figs. 1 and 6). Preferably, the plate 111 is secured in position for convenient removability, and to this end the front plate 27 of the standard carries a pin 112 engaging in a hole in the plate 111 near the lower end thereof. The upper end of the plate 111 is clamped by the head of a bolt 113 also entered in the plate 27 of the standard.

As shown in Fig. 1, the plate 27 is cut away above the bottom slide plate 38 of the carrying stick hopper, and the rack supporting member 110 is secured in such a position that the ways 109 have their upper surfaces disposed flush with the slideway for the rack formed by the plate 32. Thus, as the rack is advanced forwardly, it is supported on the ways 109, and by reason of the lateral spacing of the ways 109, the carrying sticks may be swung laterally while still frictionally engaged between their respective retaining springs 37 for the purpose of separating the bricks in the manner illustrated in Fig. 1.

The means for separating the bricks thus suspended from the rack also derives its motion from the main actuating slide 61. To this end, the plunger plate 71 has secured to the edge thereof opposite the slide 61 (Figs. 1 and 9) an angular bracket 114 having an arm extending forwardly at one edge of the front plate 27 of the standard and carrying a laterally extending arm 115 from which is suspended a bar 116. The bar 116 reciprocates with the slide 61, and in the lower portion of its movement the bar is adapted to actuate a device for separating the bricks *a* by imparting a lateral swinging movement in one direction or the other to the successive carrying sticks suspended from the rack.

The separating device comprises (Figs. 1 and 7) an oscillatory member 117 of arcuate form mounted on the rear end of the member 110 and having at its opposite side edges arms 118 and 119, the ends of which are respectively movable into engagement with opposite side edges of alternate sticks. Normally, the member 117 is held in intermediate position by means of a coiled contractile spring 120 (Fig. 1), but is provided with two laterally spaced hooks 121 and 122 adapted for engagement by the lower end of the actuating bar 116 for the purpose of rocking the member 117 in one direction or the other. In order that the member 117 shall be oscillated alternately in opposite directions, I provide a shiftable cam member 123 arranged to oscillate relative to the member 117. This cam member is slidably retained on the member 110 by a plate 123ᵃ (Fig. 6) and has two cam surfaces 124 and 125 with a pin 126 centrally thereof adapted for engagement by the hooks 121 and 122.

The actuating bar 116 is mounted for pivotal movement on its supporting arm 115 (Fig. 1), but is yieldably held in a normal vertical position. Thus, as shown in Fig. 13, the arm 115 is slotted to receive the upper end of the bar 116 to which it is pivoted, and a leaf spring 127 secured to the upper surface of the arm 115 bears against the extreme upper end of the bar 116. By this arrangement, in the lower portion of its stroke the actuating bar 116 engages with one of the cam surfaces 124 or 125, and is deflected thereby into engagement with one of the hooks 121 and 122.

As shown in Fig. 7, the bar has been deflected by the cam surface 125 and moved into engagement with the hook 122 so as to rock the oscillatory member 117 in a clockwise direction as shown in said figure. In such movement, the arm 119 of the oscillatory member engages with a carrying stick 22 to swing it together with its brick *a* laterally to the left in Figs. 1 and 7. As an incident to such movement of the member 117, the pin 126 of the cam member has been engaged during the latter part of the movement by the hook 121, whereby to shift the cam member somewhat beyond its central or intermediate position with the cam surface 124 presented to the bar 116. Thus, in alternate reciprocations of the bar 116, it is deflected to opposite sides of the oscillatory member 117 for the purpose of rocking said member alternately in opposite directions and thereby swinging the successive carrying sticks 22 oppositely as shown clearly in Fig. 1.

Referring now to the time chart (Fig. 15) the operation will be summarized as follows:—

Assuming a block A of ice cream or the like to have been positioned in its supporting trough 20 and that the rack 21 has been properly positioned on its slideway 32, the clutch lever 105 is raised to withdraw the pawl 104 (Fig. 13) from the lugs 106 and 107 whereby to effect the engagement of the clutch. Any convenient means may be employed to retain the lever 105 in its raised position, such as for example, a spring detent 128 which may be engageable with a suitable stationary part of the standard.

With the parts in the position shown in Fig. 1, the link 62 is first drawn downwardly to effect the first down stroke of the slide 61. In this movement, the first carrying stick 22 is engaged by the plunger 72 and forced downwardly through the slots 75 and 76 between the first pair of retaining springs 37 of the rack 21, until at the lower end of the downward stroke of the slide, the lower end of the stick is embedded in the forward end portion of the block A. The latter, it will be observed, initially projects forwardly of the forward end of the trough 20 a distance corresponding to the thickness of the bricks *a*. Such downward movement of the slide is indicated diagrammatically in the time chart at 129, and the corresponding movement of the first carrying stick is indicated at 130. At the same time, the cutter blades 23 operate idly from open to closed position as shown by the broken line 131, being substantially in the relation shown in Fig. 3 during the insertion of the stick. Also, in the latter portion of such downward movement of the slide, the feed pawl 58 is retracted, as indicated at 132 in the chart, for engagement with the next rearward tooth on the carrying rack 21.

In the ensuing upward stroke of the slide indicated at 133, the cutter blades move into open position as shown at 134, and in the latter portion of such upward movement of the slide, the feed pawl 58 is actuated as indicated at 135 to advance the rack 21 and also the block A one step or a distance corresponding to the thickness of the bricks to be formed.

In the next cycle of operation, the slide in moving downwardly, inserts the second carrying stick in the next retaining device of the carrier and into the frozen material of the block A, as in the preceding cycle; and in the latter portion of this cycle, the cutter blades move into closed relation as indicated at 136 to cut off the first brick. In the initial portion of the upward movement of the slide, the blades separate and disengage from the material in time to permit of the second advancing step of the rack as indicated at 137.

The operation of separating the bricks occurs for the first time in the third cycle during the latter portion of the downward stroke of the slide as indicated at 138. In this operation, the oscillatory member 117 is actuated in one direction by its actuating bar 116. In the next or fourth cycle, the same operations occur, except that the oscillatory member 117 is shifted in the opposite direction as indicated at 139 in the chart to cause the next carrying stick to be engaged and swung in the opposite direction from that of the first.

The operating cycles thus continue in rapid succession, the carrier and block of frozen material being advanced step by step, and the carrying sticks being automatically fed forwardly as required. Finally, when the block A has been converted into a succession of bricks suspended in the carrier in spaced relation, the carrier may be removed from the ways 109 of the member 110 and the separated bricks, suspended from the rack through the medium of their carrying sticks, may be immersed in a bath of coating material (Fig. 12).

While the machine may be brought to rest manually through the operation of the hand lever 105, provision is preferably made for stopping the machine automatically. For this purpose, the lever 105 has formed rigid with its inner end an arm 140 which projects upwardly into the path of movement of a cam member 141 (Fig. 1) on the supporting bracket 50 of the block feeding device. These parts 140, 141 are so positioned and shaped that the pawl 104 is moved into the path of rotation of the lugs 106 and 107 to stop the machine at the end of the cycle with the slide 61 in its uppermost position. The operator may then place a new block of frozen material in the trough 20 with its forward end portion projecting therefrom a distance corresponding to the thickness of the bricks to be cut, and correspondingly position the carrying rack 21 and rack bar 52 on their respective slideways.

To facilitate the introduction of a new supply of carrying sticks into the stick hopper, the plate 42 carrying the pressure shoe 41 may be equipped with a finger piece 142 whereby the shoe may be drawn rearwardly against the action of the weight 45.

While I have provided a machine capable of operating automatically to produce in rapid succession, frozen confections of the character set forth, it will be understood that in its broader aspect, the invention is not limited to an automatic machine, but contemplates the use of apparatus including a support for an elongated block of frozen material and a carrying rack through which the carrying sticks may be inserted, so as to be suspended at their upper ends from the rack while their lower ends are inserted into embedded or anchoring relation to the frozen material constituting the bricks. Also, it is important that the sticks be engaged by the rack in such a way as to permit of the lateral swinging movement thereof into separated relation for convenience in the final dipping operation.

I claim as my invention:

1. A machine for making frozen confections, comprising a support for a block of frozen material, means for cutting off the end portion of the block transversely to form a plurality of bricks, a rack having a succession of stick-retaining devices and adapted to be supported at one side of said block, means for supporting a plurality of sticks side by side and means operative upon said sticks to insert them one by one into said material, one for each of said bricks, and also bring them into operative association successively with said retaining devices of the rack, with one end of each stick embedded in the frozen material and the other end engaged by one of said retaining devices of the rack.

2. A machine for making frozen confections, comprising a support for a block of frozen material, means for cutting successive bricks from the end portion of the block transversely, a rack having a plurality of stick-retaining devices, means for moving said rack in synchronism with said cutting means whereby to present the successive retaining devices to a position adjacent the end position of said block and means operative upon said sticks successively to move each of them first into engagement with one of said devices and then into said material; whereby to leave one end of each stick embedded in one of said bricks and the other end engaged by one of said retaining devices of the rack.

3. A machine for making frozen confections, comprising a support for a block of frozen material, means for cutting the block transversely to form a plurality of bricks, means for supporting a plurality of carrying sticks, a conveyor supported adjacent said block and having a plurality of stick-retaining devices, means for advancing said block and said conveyor in unison, and means operative upon said sticks to insert them one at a time into said material, one for each of said bricks, and also into operative association with said retaining devices, said inserting means being operative in timed relation to the advance of the block and conveyor.

4. A machine for making frozen confections, comprising a support for a block of frozen material, means for cutting the block transversely to form a plurality of bricks, means for supporting a plurality of carrying sticks, a rack having a plurality of stick-retaining devices adapted to be supported at one side of said block, means operative upon said sticks one at a time to embed one end thereof in said frozen material and to cause the other end thereof to be engaged by one of said retaining devices of the rack, and feed mechanism for advancing said block and rack with a step-by-step motion in timed relation to the means operating upon said sticks.

5. A machine for making frozen confections, comprising, in combination, means for supporting an elongated block of frozen material in a horizontal position, an elongated conveyor adapted to be supported at one side of the block and having a plurality of spaced retaining devices, means for advancing said conveyor to move the successive devices to a position adjacent the advanced end position of said block and means for inserting carrying sticks one by one through said conveyor and into said frozen material, with one end of each stick embedded in the material and the projecting portion of the stick engaged by one of said retaining devices.

6. A machine for making frozen confections having, in combination, a support on which a block of frozen material is adapted to be placed with one end of the block projecting from said support, means for inserting a carrying stick into said projecting end portion of the block to anchor one end of the stick in the material, means operative to cut the projecting end portion of the block transversely thereof to form a small brick having a carrying stick embedded therein, and means engaging each successive stick upon driving thereof into said blocks and operating to support a succession of the said bricks through the medium of their sticks.

7. A machine for making frozen confections having, in combination, a support on which a block of frozen material is adapted to be placed with one end of the block projecting from said support, means for inserting a carrying stick into said projecting end portion of the block to anchor one end of the stick in the material, means operative to cut the projecting end portion of the block transversely thereof to form a small brick having a carrying stick embedded therein, and means engaging said stick to support the separate brick comprising a conveyor having a retaining device, the means for inserting the stick into the frozen material also being operative to effect the engagement of the projecting end portion of the stick with said retaining device.

8. A machine for making frozen confections, having, in combination, a support upon which a block of frozen material is adapted to be placed, an elongated conveyor adjacent said block and having a plurality of longitudinally spaced retaining devices, means operative to advance said block and conveyor in unison and with a step-by-step motion, means operative in timed relation to such advance of the block and conveyor to insert carrying sticks one at a time through the foremost one of said retaining devices, with one end of each stick embedded in the frozen material and the other end engaged by one of said retaining devices, and means operating in timed relation to said advancing movements of the conveyor and block to cut the same transversely thereof whereby to form a brick on the end of each retaining stick.

9. A machine for making frozen confections, having, in combination, a support for a block of frozen material, means for cutting the block transversely to form a plurality of bricks, means for inserting carrying sticks into said frozen material one for each of said bricks, means operative as an incident to the insertion of the sticks into the material to engage and hold the sticks for swinging movement, means acting after each cutting operation to advance said block together with the separate bricks and the holding means therefor, and means for supporting said holding means upon such advancing movement adapted to permit the sticks to be swung relative to each other.

10. A machine for making frozen confections having, in combination, a support for a block of frozen material, means for cutting the block transversely to form a plurality of bricks successively, a support adapted to be supported adjacent said block, means for inserting carrying sticks into embedded relation to said frozen material and into holding engagement with said support, means for advancing the support and the block in unison in timed relation to the operation of said cutting means and to the insertion of said sticks, and means for supporting the support in the advance of the bricks beyond said cutting means with the bricks suspended through the medium of their respective carrying sticks.

11. A machine for making frozen confections having, in combination, means for supporting a block of frozen material, means for cutting the block transversely thereof to form a plurality of bricks in succession, a rack adapted to be supported at one side of said block and having a plurality of retaining devices, means for inserting carrying sticks one at a time into holding relation with said retaining devices of the rack and into embedded relation to the frozen material, means for advancing the rack and block in unison with a step-by-step motion in timed relation to the operation of said cutting means, means for supporting the rack with a plurality of bricks suspended therefrom through the medium of their carrying sticks, and means operative upon the carrying sticks to move the bricks suspended therefrom into separated relation.

12. A machine for making frozen confections having, in combination, means for supporting a block of frozen material, means for cutting the block transversely thereof to form a plurality of bricks in succession, a rack adapted to be supported at one side of said block and having a plurality of retaining devices, means for inserting carrying sticks one at a time into holding relation with said retaining devices of the rack and into embedded relation to the frozen material, means for advancing the rack and block in unison with a step-by-step motion in timed relation to the operation of said cutting means, means for supporting the rack with a plurality of bricks suspended therefrom through the medium of their carrying sticks, and means operating upon the successive carrying sticks in their advance beyond said cutting means to move them alternately in opposite directions whereby to separate said bricks.

13. In a machine of the character set forth, means for supporting a block of frozen material, a hopper adapted to contain a stack of carrying sticks, an elongated support interposed between said hopper and said block of material and having a plurality of retaining devices, and means operative upon the foremost one of said sticks in the stack to move it through one of said retaining devices of the support and into said material with the stick engaging with its retaining device while being embedded in the frozen material.

14. In a machine of the character set forth, means for supporting a block of frozen material, a hopper adapted to contain a stack of carrying sticks, a guide for the sticks, means for positioning the sticks relative to said guide, a rack mounted between said hopper and said block of material and having a plurality of retaining devices, means operative to advance the block and rack in unison with a step-by-step motion, and means operating in timed relation to said advancing means for moving the foremost one of said sticks in the stack through said guide into holding relation with one of said retaining devices and into anchored relation to the frozen material.

15. In a machine of the character set forth, means for supporting a block of frozen material, a hopper adapted to contain a stack of carrying sticks, a rack having a plurality of retaining devices, means for guiding the foremost stick of the stack, means for successively positioning said rack and said block relative to said guide means, and means operative upon the foremost stick of the stack to force it through said rack and into said frozen material comprising a reciprocatory slide having a plunger engageable with the foremost stick, said positioning means being operative in the movement of said slide to advance said rack and said block.

16. In a machine of the character set forth, means for supporting a block of frozen material, a hopper adapted to contain a stack of carrying sticks, a rack supported between said hopper and said block and having a plurality of retaining devices, means operative to insert the foremost one of said sticks through said rack and into anchored relation to said frozen material with the projecting end of the stick engaged by one of said retaining devices, said last mentioned means including a slide movable in a direction perpendicular to said rack and block, and means operative in the movement of the slide in a direction away from the block to advance the rack and block whereby to position the latter for the succeeding stick-inserting operation.

17. In a machine of the character set forth, means for supporting a block of frozen material, a hopper adapted to contain a stack of carrying sticks, a rack supported between said hopper and said block and having a plurality of retaining devices, means operative to insert the foremost one of said sticks through said rack and into anchored relation to said frozen material with the projecting end of the stick engaged by one of said retaining devices, said last mentioned means including a slide movable in a direction perpendicular to said rack and block, and a pawl and ratchet mechanism operative in the movement of said slide in a direction away from the block to advance the rack and block in unison.

18. In a machine of the character set forth, means for supporting a block of frozen material, a rack removably supported at one side of said block and mechanism for advancing said rack and block with a step-by-step motion including a reciprocatory member, a rack bar arranged for reciprocation in a direction parallel to said rack and operatively connected with said reciprocatory member, and a pair of pawls one operative in the movement of the rack bar in one direction to advance the rack and block, one of said pawls being adapted to engage with the rack to move it, and a feed plate for the block having the other one of said pawls connected therewith and engageable by the rack bar for movement by the latter.

19. In a machine of the character set forth, means for supporting a block of frozen material, means for cutting the material transversely thereof to form a plurality of bricks, a rack having a plurality of retaining devices, means for anchoring carrying sticks in the respective bricks and engaging the projecting ends of the sticks in said rack, means for advancing said block and rack with a step-by-step motion, means operative upon the successive sticks to move them alternately in opposite directions whereby to separate the bricks, and an actuating mechanism including a reciprocatory member, said advancing and said separating means being operatively associated with said member.

20. In a machine of the character set forth, a vertically reciprocable slide, means for supporting a block of frozen material for movement horizontally beneath said slide, a rack supported between said block and said slide, feed mechanism operatively connected with said slide for advancing said block and said rack, means operating in timed relation to said slide for cutting the block transversely thereof to form separate bricks, means operatively connected with said slide for inserting carrying sticks successively into holding engagement with the rack and into embedded relation to the frozen material, and means operative in the movement of the slide to engage successive sticks and move them in opposite directions whereby to separate the bricks relative to each other while suspended from the rack.

21. In a machine of the character set forth, means for inserting one end of a carrying stick in a mass of frozen material including a guide device having a slot adapted to receive the sticks and having one wall in the form of a movable member and a plunger operative to move a stick through said slot; and a reciprocatory actuating member for the plunger operative to move said wall member to open said slot whereby to permit movement of the stick laterally out of the slot.

22. In a machine of the character set forth, a rack having a plurality of retaining devices adapted to engage and hold a stick projecting from a brick of frozen material, means for supporting the rack with said sticks depending therefrom, and means including an oscillatory member movable alternately into engagement with adjacent sticks for swinging the latter in opposite directions.

23. In a machine of the character set forth, an elongated rack having a plurality of retaining devices spaced longitudinally of the rack, mechanism for forming a plurality of bricks each with a carrying stick embedded therein and engaged with one of said retaining devices of the rack, means for advancing the rack with a step-by-step motion, means operative upon successive carrying sticks to swing them in opposite directions while supported by the rack, including a plunger arranged for reciprocation in a direction perpendicular to the rack, an oscillatory member arranged for actuation by said plunger and adapted to engage successive sticks in successive operations of the plunger, and means controlling said plunger to move said oscillatory member alternately in opposite directions.

24. In a machine of the character set forth, an elongated rack having a plurality of retaining devices spaced longitudinally of the rack, mechanism for forming a plurality of bricks each with a carrying stick embedded therein and engaged with one of said retaining devices of the rack, means for advancing the rack with a step-by-step motion, means operative upon successive carrying sticks to swing them in opposite directions while supported by the rack, including a plunger arranged for reciprocation in a direction perpendicular to the rack, an oscillatory member arranged for actuation by said plunger and adapted to engage successive sticks in successive operations of the plunger, shiftable cam means actuated by said plunger and operative to control the movement thereof, and means on said member alternately engageable by said plunger under the control of said cam means to move said member alternately in opposite directions.

25. In a machine of the character set forth, the combination with an elongated conveyor having a plurality of retaining devices, mechanism operative to form a plurality of bricks of frozen material each having a carrying stick embedded at one end in the material, said mechanism including means for successively embedding said sticks in the material and means operative automatically as an incident to the embedding of the successive sticks in the bricks to suspend said sticks from said conveyor with the respective sticks engaged in said retaining devices.

26. In a machine of the character set forth, the combination with an elongated rack having a plurality of retaining devices, a mechanism operative to form a plurality of bricks of frozen material each having a carrying stick embedded at one end in the material, said mechanism including means for successively embedding said sticks in the material and means operative automatically as an incident to the embedding of the successive sticks in said bricks to suspend said sticks from said rack with the respective sticks engaged in said retaining devices, and means operative to separate said bricks while suspended from the rack by swinging the sticks alternately in opposite directions.

27. For use in the art of making frozen confections of the type composed of a brick of frozen material and a carrying stick having one end embedded in the brick, a rack comprising two spaced parallel bars, and helically coiled compression springs interposed in pairs between said bars with each pair of springs constituting a retaining device adapted to receive and frictionally hold a carrying stick.

28. Apparatus for making frozen confections comprising means for supporting a block of frozen material, means for severing the block transversely thereof to form a plurality of small bricks, a travelling conveyor having a plurality of retaining devices and movable in a path at one side of the block, and means for inserting successive carrying sticks through the retaining devices and into anchored relation to the frozen material with one end of each stick embedded in one of said bricks and the other end in holding relation with said conveyor.

29. A machine for making frozen confections having, in combination, means for supporting a block of frozen material, means for advancing the block with a step-by-step motion in an endwise direction, a common support for a plurality of carrying sticks having spaced retaining devices engaging the successive sticks, means operating in timed relation to said advancing means to project sticks successively through one of said retaining devices into the end portion of said block, and means for cutting off the end portion of the block while the latter is held in position by said support acting through the medium of one of said sticks.

SWAN F. ANDERSON.

CERTIFICATE OF CORRECTION.

Patent No. 2,094,769.            October 5, 1937.

SWAN F. ANDERSON.

It is hereby certified that error appears in the printed specification of the above numbered patent requiring correction as follows: Page 5, second column, line 26, claim 1, for the word "plurality" read succession; and line 27, same claim, for "succession" read plurality; and that the said Letters Patent should be read with these corrections therein that the same may conform to the record of the case in the Patent Office.

Signed and sealed this 18th day of January, A. D. 1938.

(Seal).                          Henry Van Arsdale,
                                     Acting Commissioner of Patents.

tions while supported by the rack, including a plunger arranged for reciprocation in a direction perpendicular to the rack, an oscillatory member arranged for actuation by said plunger and adapted to engage successive sticks in successive operations of the plunger, shiftable cam means actuated by said plunger and operative to control the movement thereof, and means on said member alternately engageable by said plunger under the control of said cam means to move said member alternately in opposite directions.

25. In a machine of the character set forth, the combination with an elongated conveyor having a plurality of retaining devices, mechanism operative to form a plurality of bricks of frozen material each having a carrying stick embedded at one end in the material, said mechanism including means for successively embedding said sticks in the material and means operative automatically as an incident to the embedding of the successive sticks in the bricks to suspend said sticks from said conveyor with the respective sticks engaged in said retaining devices.

26. In a machine of the character set forth, the combination with an elongated rack having a plurality of retaining devices, a mechanism operative to form a plurality of bricks of frozen material each having a carrying stick embedded at one end in the material, said mechanism including means for successively embedding said sticks in the material and means operative automatically as an incident to the embedding of the successive sticks in said bricks to suspend said sticks from said rack with the respective sticks engaged in said retaining devices, and means operative to separate said bricks while suspended from the rack by swinging the sticks alternately in opposite directions.

27. For use in the art of making frozen confections of the type composed of a brick of frozen material and a carrying stick having one end embedded in the brick, a rack comprising two spaced parallel bars, and helically coiled compression springs interposed in pairs between said bars with each pair of springs constituting a retaining device adapted to receive and frictionally hold a carrying stick.

28. Apparatus for making frozen confections comprising means for supporting a block of frozen material, means for severing the block transversely thereof to form a plurality of small bricks, a travelling conveyor having a plurality of retaining devices and movable in a path at one side of the block, and means for inserting successive carrying sticks through the retaining devices and into anchored relation to the frozen material with one end of each stick embedded in one of said bricks and the other end in holding relation with said conveyor.

29. A machine for making frozen confections having, in combination, means for supporting a block of frozen material, means for advancing the block with a step-by-step motion in an endwise direction, a common support for a plurality of carrying sticks having spaced retaining devices engaging the successive sticks, means operating in timed relation to said advancing means to project sticks successively through one of said retaining devices into the end portion of said block, and means for cutting off the end portion of the block while the latter is held in position by said support acting through the medium of one of said sticks.

SWAN F. ANDERSON.

CERTIFICATE OF CORRECTION.

Patent No. 2,094,769. October 5, 1937.

SWAN F. ANDERSON.

It is hereby certified that error appears in the printed specification of the above numbered patent requiring correction as follows: Page 5, second column, line 26, claim 1, for the word "plurality" read succession; and line 27, same claim, for "succession" read plurality; and that the said Letters Patent should be read with these corrections therein that the same may conform to the record of the case in the Patent Office.

Signed and sealed this 18th day of January, A. D. 1938.

(Seal).

Henry Van Arsdale,
Acting Commissioner of Patents.

CERTIFICATE OF CORRECTION.

Patent No. 2,094,769. October 5, 1937.

SWAN F. ANDERSON.

It is hereby certified that error appears in the printed specification of the above numbered patent requiring correction as follows: Page 5, second column, line 26, claim 1, for the word "plurality" read succession; and line 27, same claim, for "succession" read plurality; and that the said Letters Patent should be read with these corrections therein that the same may conform to the record of the case in the Patent Office.

Signed and sealed this 18th day of January, A. D. 1938.

(Seal).

Henry Van Arsdale,
Acting Commissioner of Patents.